US012792647B1

(12) United States Patent
Zou et al.

(10) Patent No.: US 12,792,647 B1
(45) Date of Patent: Nov. 10, 2026

(54) MULTIMODAL RETRIEVAL AUGMENTED GENERATION

(71) Applicant: Amazon Technologies, Inc., Seattle, WA (US)

(72) Inventors: Yide Zou, Redmond, WA (US); Vivek Govindan, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 18/747,774

(22) Filed: Jun. 19, 2024

(51) Int. Cl.

| | |
|---|---|
| ***G06F 16/335*** | (2019.01) |
| ***G06F 16/334*** | (2025.01) |
| ***G10L 15/26*** | (2006.01) |

(52) U.S. Cl.
CPC ...... *G06F 16/3344* (2019.01); *G06F 16/3347* (2019.01); *G06F 16/335* (2019.01); *G10L 15/26* (2013.01)

(58) Field of Classification Search
None
See application file for complete search history.

(56) References Cited

U.S. PATENT DOCUMENTS

| | | | |
|---|---|---|---|
| 6,208,964 | B1 | 3/2001 | Sabourin |
| 7,401,017 | B2 | 7/2008 | Murveit |
| 7,782,826 | B2 | 8/2010 | Olivier et al. |
| 9,171,541 | B2 | 10/2015 | Kennewick et al. |
| 9,280,653 | B2 | 3/2016 | Forest |
| 9,854,442 | B2 | 12/2017 | Mazzara, Jr. |
| 10,140,099 | B2 | 11/2018 | Kintali |
| 11,035,207 | B2 | 6/2021 | Francis |
| 11,138,520 | B2 | 10/2021 | Ganti et al. |
| 11,238,228 | B2 | 2/2022 | Relangi et al. |
| 11,354,463 | B1 | 6/2022 | Babaali |
| 11,397,823 | B1 | 7/2022 | Agenti |
| 11,403,466 | B2 | 8/2022 | Peng et al. |
| 11,645,282 | B1 | 5/2023 | Garcia et al. |
| 11,710,355 | B1 | 7/2023 | Wenneman et al. |
| 11,743,344 | B1 | 8/2023 | Rodriquez et al. |

(Continued)

OTHER PUBLICATIONS

Sayfan, Gigi, "Matering Kubernetes," May 17, 2017, Packt Publishing Ltd., Birmingham UK, pp. 1-400.

(Continued)

*Primary Examiner* — Yu Zhao
(74) *Attorney, Agent, or Firm* — Alexander A. Knapp; Kowert, Hood, Munyon, Rankin & Goetzel, P.C.

(57) ABSTRACT

A retrieval augmented generation (RAG) system determines, based on a query, an audio embedding type or a text embeddings type to use to filter an embeddings store, wherein the embedding store includes embeddings of the audio embedding type and the text embeddings type in a vector space. The RAG system obtains, from a filtered portion of the embeddings store, embeddings based on similarity scores between the plurality of embeddings and a representation of the query in the vector space. The RAG system obtains embedding source data from which a selected one of the plurality of embeddings of the embeddings store have been generated, wherein the embedding source data is source audio data or transcribed source audio data used to generate the embeddings in the embeddings store. The RAG system provides the query and the embedding source data for the selected embedding to the multimodal LLM.

20 Claims, 9 Drawing Sheets

(56) References Cited

U.S. PATENT DOCUMENTS

| | | | | |
|---|---|---|---|---|
| 11,917,040 | B1 | 2/2024 | Rodriguez et al. | |
| 2007/0071206 | A1* | 3/2007 | Gainsboro | H04M 3/42221 379/168 |
| 2009/0299991 | A1* | 12/2009 | Zarzar Charur | G06F 16/3322 707/999.005 |
| 2015/0331974 | A1 | 11/2015 | Subbarayan | |
| 2016/0099806 | A1 | 4/2016 | Racklyeft et al. | |
| 2016/0330032 | A1 | 11/2016 | Naim et al. | |
| 2019/0171669 | A1 | 6/2019 | Patankar | |
| 2020/0050636 | A1* | 2/2020 | Datla | G06F 40/30 |
| 2020/0089487 | A1 | 3/2020 | Ramic et al. | |
| 2020/0184155 | A1 | 6/2020 | Galitsky | |
| 2020/0294401 | A1 | 9/2020 | Kerecsen | |
| 2021/0302941 | A1 | 9/2021 | Francis et al. | |
| 2022/0078077 | A1 | 3/2022 | Mifsud et al. | |
| 2023/0259705 | A1 | 8/2023 | Tunstall-Pedoe et al. | |
| 2023/0306087 | A1* | 9/2023 | Krishnan | G06F 16/24556 |
| 2024/0362279 | A1* | 10/2024 | Kharbanda | G06F 16/9032 |

OTHER PUBLICATIONS

U.S. Appl. No. 18/194,391, filed Mar. 31, 2023, Alex Bessonov, et al.

U.S. Appl. No. 18/809,878, filed Jun. 29, 2022, Roland Mesde, et al.

U.S. Appl. No. 17/548,216, filed Dec. 10, 2021, Davis et al.

U.S. Appl. No. 18/192,351, filed Mar. 29, 2023, Roland Mesde, et al.

Lili Zhang et al., "A DRM System Based on PKI", 2010 Fourth International Conference on Genetic and Evolutionary Computing, IEEE, 2010, pp. 522-525.

Mattias Ohrn, "Publice Key Infrastructure Utilisation in Digital Rights Management", KTH Numerical Analysis and Computer Science, 2004, pp. 1-84.

U.S. Appl. No. 18/622,689, filed May 29, 2024, Michael Garcia.

Joon Sung Park, et al., Generatived Agents: Interactive Simulacra of Human Behavior, retrieved from arXiv:2304.03442V2, dated Aug. 6, 2023, pp. 1-22.

"AI Code Generator-Amazon CodeWhisperer," AWS, retrieved from https://aws.amazon.com/codewhisperer/ on Dec. 14, 2023, pp. 1-17.

"CAN Bus Explained—A Simple Intro [2023]," CSS Electronics, retrieved from https://www.csselectronics.com/pages/can-bus-simple-intro-tutorial on Dec. 14, 2023, pp. 1-34.

U.S. Appl. No. 18/540,564, filed Dec. 14, 2023, David Joseph Mifsud, et al.

U.S. Appl. No. 18/477,225, filed Sep. 28, 2023, Michael Garcia, et al.

U.S. Appl. No. 18/471,107, filed Sep. 20, 2023, Alex Bessonov, et al.

U.S. Appl. No. 18/190,007, filed Mar. 24, 2023, Masahito et al.

Jasmine Bhaskar et al, "Hybrid Approach for Emotion Classification of Audio Conversation Based on Text and Speech Mining", ScienceDirect, Procedia Computer Science 46, pp. 635-643, 2015.

U.S. Appl. No. 18/190,008, filed Mar. 24, 2023, Togami et al.

U.S. Appl. No. 17/810,302, filed Jun. 30, 2022, Sunkara, et al.

U.S. Appl. No. 18/339,749, filed Jun. 22, 2023, Aparna Elangovan, et al.

U.S. Appl. No. 18/343,611, filed Jun. 28, 2023, Sandesh Swamy, et al.

* cited by examiner

MULTIMODAL RETRIEVAL AUGMENTED GENERATION

BACKGROUND

Large language models (LLMs) are advanced machine learning models designed to understand and generate human language. LLMs may be employed across various scenarios requiring language comprehension. For instance, LLMs may be utilized in natural language processing (NLP) applications such as chatbots, content generation, and language translation, wherein LLMs may be required to interpret and produce text responses across diverse contexts. Given the broad spectrum of subject matters, LLMs are trained on large datasets encompassing different domains in order to ensure that the LLMs may be able to handle a wide variety of linguistic tasks, such as generating coherent and contextually appropriate answers to queries provided by a user.

Figure 1A:
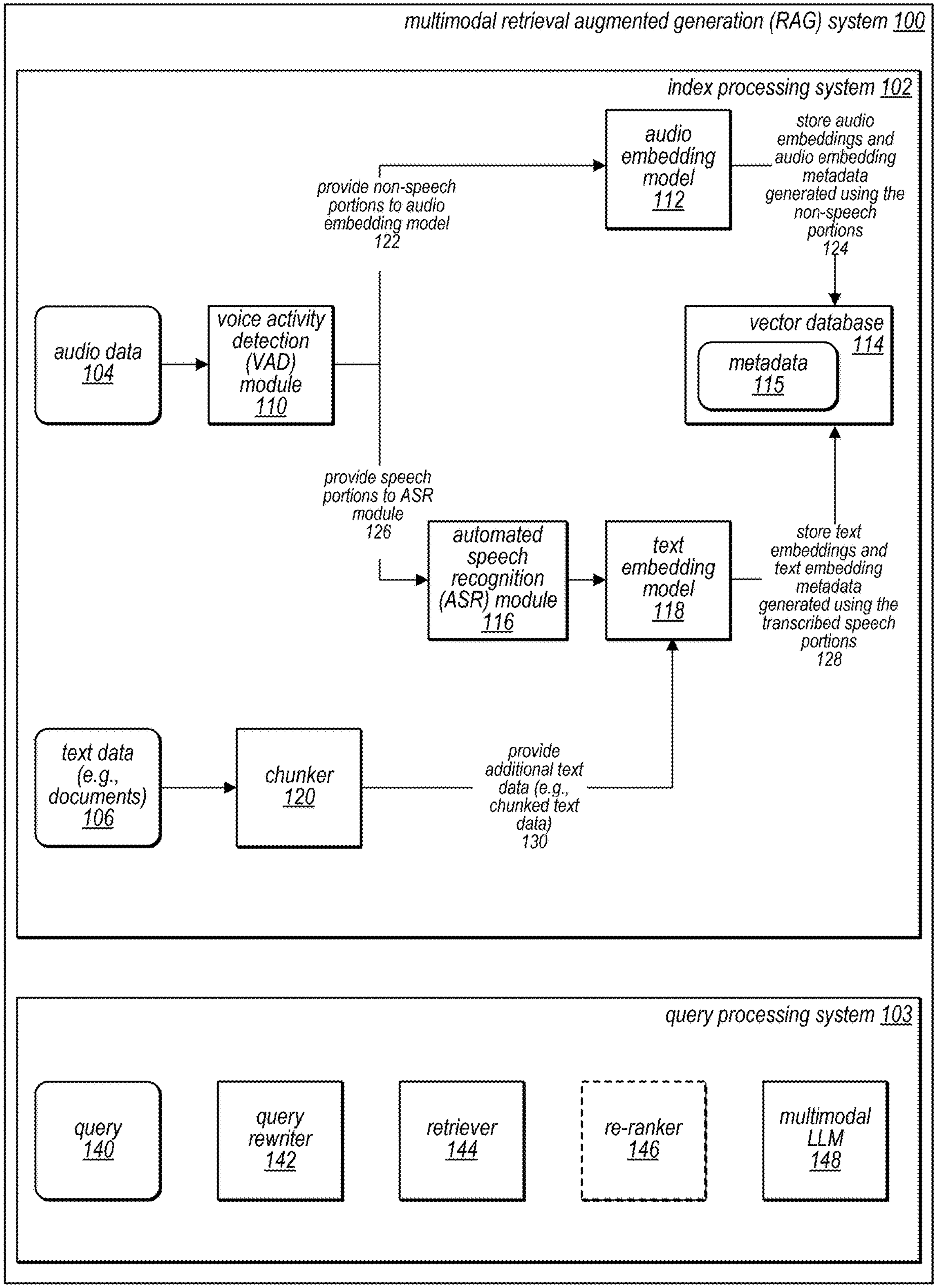
FIG. 1A is a block diagram illustrating a retrieval augmented generation (RAG) system, wherein an index processing system of the multimodal RAG system distinguishes between non-speech portions and speech portions of audio data and generates audio embeddings and text embeddings respectively, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a retrieval augmented generation (RAG) system that determines embedding source data to be provided with a query for a multimodal large language model (LLM), wherein both the query and the embedding source data are used to answer the query. The multimodal RAG system may obtain audio data, wherein the multimodal RAG system determines for the audio data non-speech portions of the audio data and speech portions of the audio data. The multimodal RAG system may use the non-speech portions and the speech portions of audio data to generate audio embeddings and text embeddings respectively and may store both types of embeddings in a vector database. The multimodal RAG system may determine the type of embedding to use for a query and obtain, from the vector database, embeddings of the determined type. The multimodal RAG system may obtain embeddings based on similarity scores between the embeddings of the determined type of embedding, wherein the similarity score measures similarity between and a representation of the query in a vector space and the embeddings stored in the vector database. The multimodal RAG system may select an embedding based on the similarity score. The multimodal RAG system may provide the query and embedding source data from which the selected embedding were generated to a multimodal LLM, wherein the multimodal LLM may use the query and embedding source data to generate an answer for the query.

RAG is a technique in natural language processing (NLP) that enhances the capabilities of large language models (LLMs) by integrating an external data retrieval component. RAG combines the generative abilities of LLMs with context provided by information retrieval systems. For example, when a prompt is presented by a user, a retrieval mechanism of the data retrieval component may first search a dataset or other knowledge databases to find relevant documents or pieces of information that are to be used by an LLM to generate a response to the prompt. These retrieved documents may be fed into the LLM, which in turn, uses the retrieved document to generate a more accurate/contextually appropriate response. RAG may allow the LLM to access up-to-date and/or context-specific information that may not be included in the LLM's training data. RAG may improve performance of the LLM in tasks requiring current knowledge or specialized information. However, application of RAG in multimodal LLM context may pose significant challenges. For example, a trivial approach of transcribing audio data stored in the dataset/knowledge databases into text before applying traditional RAG techniques may fail to support non-speech audio and may lessen advantages of using multimodal LLMs (that are able to support different modes of data). For example, such method that solely convert spoken words into text may ignore other significant auditory elements such as background sounds, music, or emotional tones conveyed in audio data. These non-speech audio components may carry significant contextual information that may enhance understanding of the LLMs and may be useful to generate a more accurate response. A simplistic approach of transcribing audio into text before applying RAG may neglect non-speech elements and may preclude valuable multimodal data that are obtained in the augmentation data of RAG.

Another approach may simply use a multimodal embedding model to encode audio data and text data as embedding vectors that capture the semantic relationships across different modalities. Such method may be resource prohibitive, particularly with regards to audio data as information that may be collected from speech portions of the audio data are provided to the multimodal LLM in the form of audio. For example, when audio speech is inputted directly into the multimodal LLM in its original audio form, such inputs may often results in significantly larger data sizes compared to a transcribed text version of the speech portion. Audio data, especially high-quality recordings, may require increased computational costs to process, as well as slow processing speeds at the LLM and reduce real-time application effectiveness.

In some embodiments, a multimodal RAG system for audio data processing may utilize a voice activity detection (VAD) module during an indexing process to differentiate between speech and non-speech parts of the audio. The VAD module of the multimodal RAG system may identify segments containing speech and segments with other sounds or silence, allowing the multimodal RAG system to generate embeddings differently for the different types of segments. Speech portions of the audio data may be transcribed and converted into embeddings (e.g., text embeddings), while non-speech audio, such as music or ambient sounds, may be encoded directly into embeddings (e.g., audio embeddings). The multimodal RAG system may store the embeddings in a unified vector space wherein each embeddings of different types (text embeddings generated from transcribed text/document and audio embeddings generated from non-speech segments) are identified by respective metadata.

In some embodiments, the multimodal RAG system may receive a query, wherein the query is translated into the unified vector space. The multimodal RAG system may compare the representation of the query in the vector space to the embeddings to determine similarity scores. In some embodiments, the multimodal RAG system may filter the vector database that stores the embeddings based on a type of embedding the multimodal RAG system determines as relevant. For example, based on a query about identification of an animal given an animal sound, the multimodal RAG system may determine that audio embeddings are relevant and may indicate to a retriever to obtain only audio embeddings. The multimodal RAG system may determine whether one more embeddings that were obtained has a similarity score higher than a threshold score to determine whether to rewrite the query to find embeddings with higher similarity score.

In some embodiments, the multimodal RAG system may obtain embeddings source data from which the embeddings were obtained (e.g., transcribed text used to generate text embeddings or audio portions used to generate audio embeddings). The multimodal RAG system may include in the obtained embeddings source data, additional portions of the embeddings source data that are relevant to provide context. The additional portions of the embeddings source data may be determined using metadata, such as by including portions int eh conversation provided by a number of speakers identified using the metadata. The multimodal RAG system may generate another set of similarity scores for the obtained embeddings source data to select the embedding source data to provide to the multimodal LLM. The multimodal LLM may generate an answer to the query based on the embeddings source data.

FIG. 1A is a block diagram illustrating a retrieval augmented generation (RAG) system, wherein an index processing system of the multimodal RAG system distinguishes between non-speech portions and speech portions of audio data and generates audio embeddings and text embeddings respectively, according to some embodiments.

In some embodiments, a multimodal retrieval augmented generation (RAG) system 100 may comprise an index processing system 102 and a query processing system 103. The index processing system 102 may be responsible for preparing/organizing data for retrieval during query processing. The data processed by the index processing system may be used to augment a query received by the query processing system 103 for a multimodal large language model (LLM) 148 to answer. The index processing system 102 may comprise a voice activity detection (VAD) module 110, an audio embedding model 112, an automated speech recognition (ASR) module 116, a text embedding model 118, vector database 114, and a chunker 120. In some embodiments, the index processing system 102 may ingest a variety of audio data 104 and text data 106 for processing. For example, audio data 104 may include recorded speeches, interviews, customer service call recordings, meeting transcripts, music, and environmental sounds. Text data 106 may include documents such as reports, articles, emails, transcripts of conversations, periodicals, as well as text from web pages. The audio data 104 and the text data 106 may be embedding source data from which embeddings stored in the vector database are generated.

In some embodiments, the index processing system 102 of the multimodal RAG system 100 may use the VAD module 110 to identify and segment the audio into speech and non-speech portions. For example, the VAD module 110 may segment the audio data 104 into speech and non-speech portions by analyzing the audio signal to detect patterns and features indicative of human speech. The VAD module 110 may first divide raw audio signal into short frames (e.g., duration of seconds or milliseconds), and extract various acoustic features that may be characteristic of speech. The VAD module 110 may then classify the frames that meet the criteria for speech, as well as classify segments that do not meet the speech characteristic criteria as non-speech.

In some embodiments, the VAD module 110 may provide 122 the non-speech portions of the audio data to the audio embedding model 112. The audio embedding model 112 may process the non-speech portions to generate audio embeddings. For example, the audio embedding model 112 may extract relevant features from the audio portions, such as timbre, rhythm, and spectral properties, that capture characteristics of the non-speech sounds. The audio embedding model 112 may encoded these features into an audio embedding, wherein an audio embedding may be a numerical vector representing semantic content and acoustic properties of the non-speech audio.

In some embodiments, the VAD module 110 may provide 126 speech portions to the ASR module 116. The ASR module 116 may transcribe the spoken words into text. For example, the ASR module 116 may extract features from the speech signal, perform acoustic modeling to identify phonemes, perform language modeling to construct words/sentences and generate a text transcript. Once the speech portions are transcribed into text, the resulting text may be provided to the text embedding model 118 as embeddings source data to generate text embeddings. Text embeddings may be numerical vector representations of the text data capturing semantic meaning and relationships between words, sentences, or documents for the text data. In some embodiments, the chunker 120 segment text data 106 into meaningful portions. In some embodiments, the chunker 120 may obtain the text data 106 and break down sentences or paragraphs into manageable and semantically coherent segments, the chunker 120 may provide 130 additional text data (e.g., chunked text data) to the text embedding model 118. The text embedding model 118 may use the text (e.g., transcribed text from the ASR module 116 and/or text data 106) to generate text embeddings.

In some embodiments, both audio embeddings and text embeddings may be stored in the vector database 114. For example, the audio embedding model 112 may store 124 the audio embeddings and audio embedding metadata generated using the non-speech portions and the text embedding model 118 may store 128 text embeddings and text embedding metadata generated using the transcribed speech portions. The vector database 114 may store the embeddings in a unified vector space wherein each embedding, regardless of its source, may be represented as a point in the vector space. Text embeddings and audio embeddings may both occupy the same vector space and may be indexed based on their vector values. The vector database 114 having a joint embedding space may allow retrieval of audio data based on text queries. In some embodiments, the vector database 114 may also store, along with the audio embeddings and text embeddings, metadata 115 that provide additional context and facilitate efficient retrieval of the embeddings. In some embodiments, metadata 115 may include a variety of information for the embeddings, such as a flag identifying whether the embedding is an audio embedding type or a text embedding type (e.g., vector derived from audio or text) and start time and end time of the audio data 104 from which the embedding was generated. Other metadata may include the source of the data (e.g., document title, audio file name), the timestamp of creation or extraction, language information, and segment duration for audio embeddings. Furthermore, in some embodiments, metadata 115 may include tags or labels indicating subject matter of the content, speaker or author identity, and confidence scores from the transcription or embedding generation process. The metadata 115 may be used for filtering the vector database 114 (e.g., filtering the vector database 114 for a specific type of embedding) or identifying portions of the embeddings source data to include as context. The RAG system 100 and metadata 115 are further discussed in FIGS. 2A-2B and FIGS. 3A-3B.

Figure 1B:
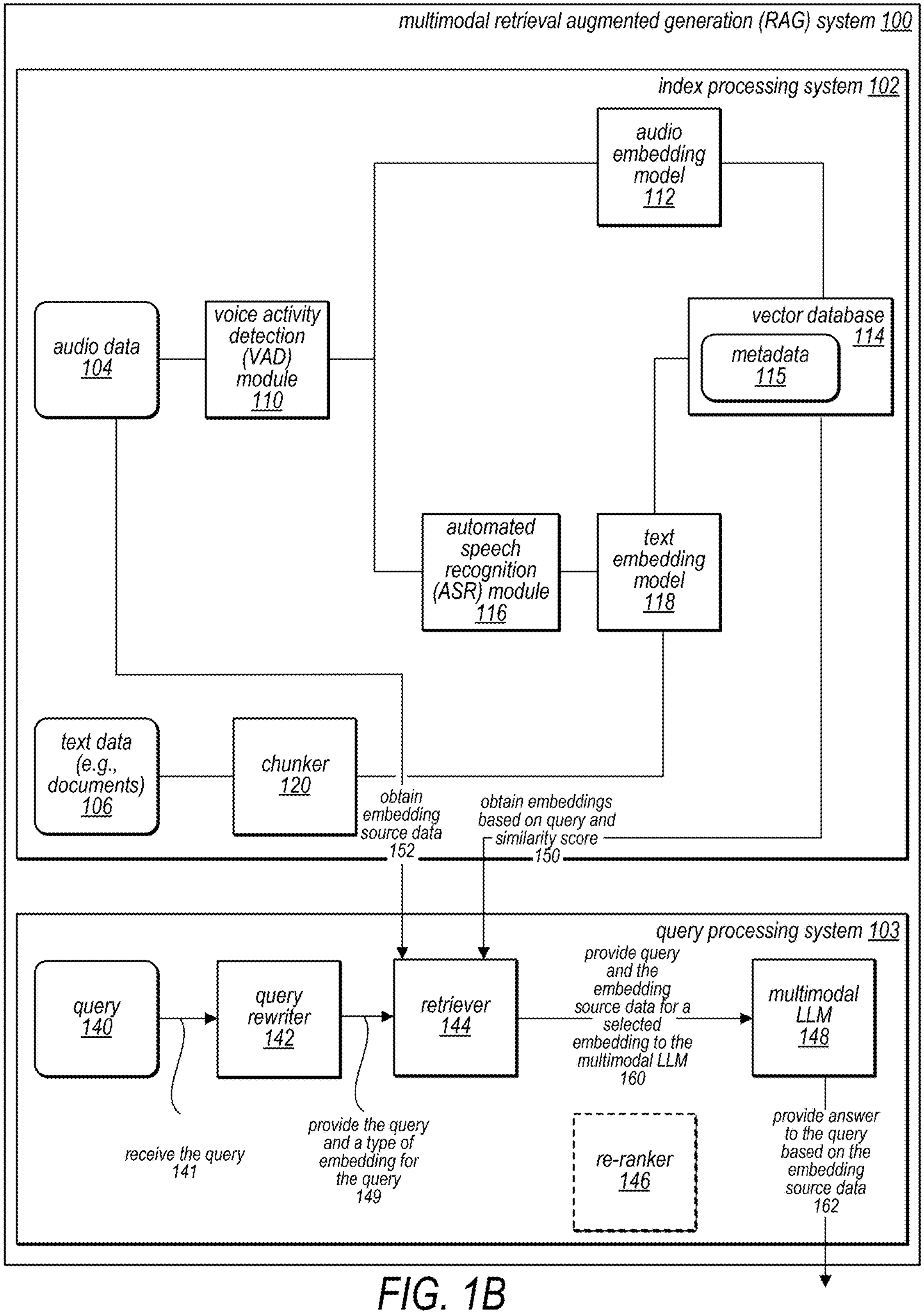
FIG. 1B is a block diagram illustrating a retrieval augmented generation (RAG) system, wherein a query processing system of the multimodal RAG system determines embedding source data to be provided with a query for a multimodal large language model (LLM), according to some embodiments.

FIG. 1B is a block diagram illustrating a retrieval augmented generation (RAG) system, wherein a query processing system of the multimodal RAG system determines embedding source data to be provided with a query for a multimodal large language model (LLM), according to some embodiments.

In some embodiments, a multimodal retrieval augmented generation (RAG) system 100 may comprise a query processing system 103. The query processing system 103 may comprise a query rewriter 142, a retriever 144, a re-ranker 146, and a multimodal LLM 148. The query processing system 103 may receive a query 140 and may use RAG techniques to generate a contextually relevant response to the query 140. The query processing system 103 may process multimodal data, such as textual inquiries for audio data. For example, the query processing system 103 of the multimodal RAG system 100 may receive a query 140 from a user. In some embodiments, the query 140 may be an initial input from the user and may be provided using various formats. For example, a user may provide the query by inputting textual queries by typing or audially by speaking their requests. In some embodiments, textual queries may range from simple keywords to complex sentences and may reflect the user's specific information needs or topics of interest. In some embodiments, the query 140 may be in the form of an audio and may be transcribed into text using ASR. In some embodiments, the query 140 may comprise both text and audio components. For example, a user may provide a query comprising the text, "what style of rhythm is represented in this audio clip?" and an audio clip provided with the text.

In some embodiments, the query rewriter 142 may receive 141 the query 140. The query rewriter 142 may be an LLM (e.g., a single modal LLM) trained to analyze the query 140 to determine its semantic intent and context. The query rewriter 142 may identify key elements such as keywords, phrases, and the overall structure of the query 140 to determine whether the retriever 142 should search for text embeddings or audio embeddings from the vector database 114. In some embodiments, the query rewriter 142 may initially provide unmodified query 140 with an indication to search for text embeddings type or audio embeddings type. In some embodiments, the query rewriter 142 may modify the query and provide the modified query to the retriever 144. The query rewriter 142 may modify the query 140 in various ways, including expanding abbreviations, resolving ambiguities, adding contextually relevant terms, reformulating the query based on intent of the user, etc. In some embodiments, to determine whether to indicate that text embedding type or audio embedding type are to be used, the query rewriter 142 may consider expected type of response. For example, the query rewriter 142 may determine that the query 140 is seeking textual information such as facts, explanations, or descriptions. Based on such determination, the query rewriter 142 may indicate to the retriever 144 that a vector database 114 is to be filtered for text embeddings. In another example, the query rewriter 142 may determine that the query 140 pertains to audio-specific requests such as environmental sounds or music, wherein the query rewriter 142 may indicate to the retriever 144 that the vector database 114 is to be filtered for audio embeddings. The query rewriter 144 is further discussed in FIGS. 2A-2B.

In some embodiments, the retriever 144 of the query processing system 103 may access the vector database 114 containing text embeddings and audio embeddings. The retriever 144 may search the vector database 114 to identify embeddings that has the highest similarity score, wherein the similarity score indicates relevance of the embeddings to the query. For example, the retriever 144 may translate the query (e.g., modified query or unmodified query) received from the query rewriter into a representation of the query in a vector space. The retriever 144 may compare the representation of the query in the vector space with embeddings stored in the vector database 114 to determine similarity scores. In some embodiments, the vector space the representation for the query may be the same vector space used for the embedding sin the vector database 114. The retriever 144 may filter the vector database 114 for only the embedding type indicated by the query rewriter 142 and may obtain 150 embeddings based on the query and a similarity score. For example, the retriever 144 may place both the representation of the query and the embeddings stored in the vector database 114 into a unified vector space and determine using mathematical techniques (e.g., cosine similarity or Euclidean distance metrics wherein each embedding and the query may be represented as points in the unified vector space) similarity scores between the query and the embeddings. Proximity in this vector space may indicate similarity in semantic meaning or contextual relevance between the query and each embedding. The retriever 144 may identify and rank the embeddings (e.g., embeddings of the filtered for embedding type) that align with the query from the query rewriter. The retriever 144 may obtain 152 embedding source data for selected ones of the obtained embeddings (e.g., obtain embedding source data for audio/text embeddings meeting a threshold similarity score).

In some embodiments, the retriever 144 may provide 160 the query 140 and the embedding source data for the selected embedding of the multimodal LLM. For example, the retriever 144 may provide the embedding source data associated with the audio/text embeddings having the highest similarity score to the multimodal LLM 148. In some embodiments, the re-ranker 146 may rank the obtained embedding source data to determine the source data and based on the re-ranking of the source data, may provide the embedding source data. The re-ranker 146 is further discussed in FIGS. 3A-3B. The multimodal LLM 148 may receive the query 140 and the embedding source data and provide 162 answer to the query based on the embedding source data.

Figure 2A:
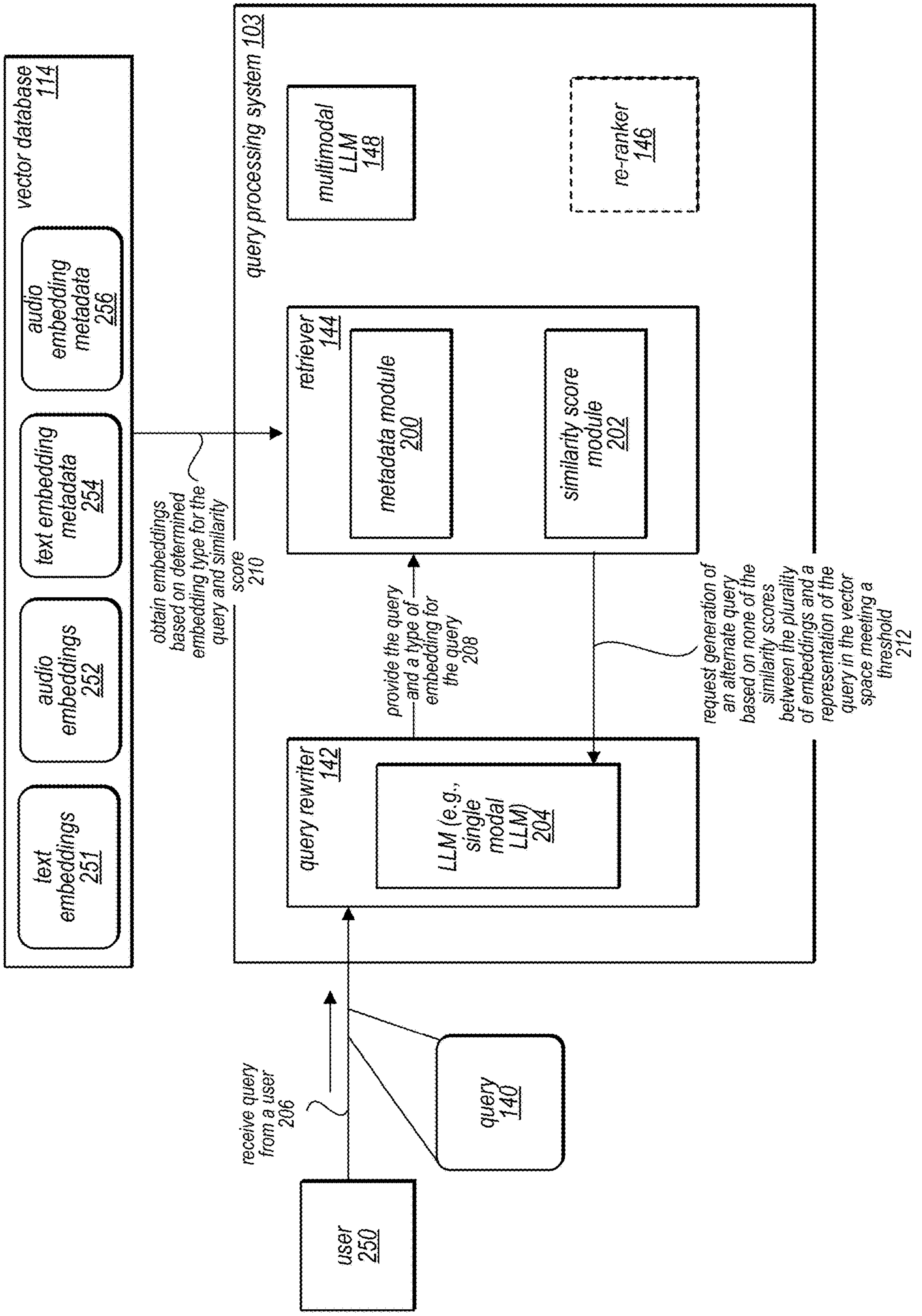
FIG. 2A illustrates a more detailed view of a query processing system of a retrieval augmented generation (RAG) system that requests an alternate query based on no similarity scores between embeddings and a representation of the query in a vector space meeting a threshold score, according to some embodiments.

FIG. 2A illustrates a more detailed view of a query processing system of a retrieval augmented generation (RAG) system that requests an alternate query based on no similarity scores between embeddings and a representation of the query in a vector space meeting a threshold score, according to some embodiments.

In some embodiments, a query rewriter 142 may receive from a user 250 a query 140. As discussed in FIG. 1B, the query may be a question for an LLM to answer. User 250 may provide queries via text input through a web interface, mobile application, command-line interface, etc. wherein the user 250 is able to type out their queries directly. Alternatively, the user 250 may employ audio input, speaking a query aloud through devices equipped with speech recognition capabilities. In some embodiments the query rewriter 142 may receive 206 a query from the user. For example, the user 250 may provide a query indicating: "What is the difference in rhythm and melody between punk music and rock music?" The query rewriter 140 may interpret semantic intent and structure of the query 140 and analyzes the query to identify key components to determine the embedding type to search for in a vector database 114. In some embodiments, the query rewriter 142 may identify key components (e.g., comparison between punk music and rock music based on the query above), and specific elements such as rhythm and melody. In some embodiments, the query rewriter 142 may expand on the terms used (such as "rhythm" and "melody" for the query above) to ensure comprehensive coverage of the user inquiry and may modify the query. In some embodiments, the query rewriter 142 may identify appropriate embedding types needed to fulfill the query—whether it requires filtering for text embeddings or audio embeddings.

The query rewriter 142 may provide 208 the query and a type of embeddings for the query to a retriever 144 to use to filter the vector database 114. In some embodiments, the retriever 144 may translate the provided query into a vector space to determine similarity scores of the embeddings stored in the vector database. Upon receiving a query from the query rewriter 142, the retriever 144 may translate the query into the same vector space as the vector database 114 wherein the embeddings are stored. The retriever 144 may determine similarity scores between the query and embeddings stored in the vector database. The retriever 144 may filter for the type of embeddings stored in the vector database, such as filtering for only text embeddings 251 or audio embeddings 252. The retriever 144 may filter for the different types of embeddings using the embedding metadata. For example, the text embedding metadata 254 may indicate that the associated embedding is a text embedding and audio embedding metadata 256 may indicate that the associated embedding is an audio embedding. In some embodiments, a metadata module 200 may use the metadata stored in the vector database 114 to determine and/or obtain only the embeddings for the embedding type identified by the query rewriter 142. In some embodiments, text embeddings metadata 254 may comprise information such as source of the text, publication date, authorship, topic classification, and language. In some embodiments, audio embedding metadata 256 may comprise duration, speaker identities or participants in the audio segment, topic or theme discussed, and audio quality assessment. A similarity score module 202 may determine similarity scores of the embeddings that were filtered for from the vector database 114. For example, given the user query: "What is the difference in rhythm and melody between punk music and rock music?" and the indication that text embedding type is to be used, the retriever translates this query into the vector space and compares it against stored embeddings of textual descriptions or audio samples related to punk and rock music. In some embodiments, the similarity score module 202 may compute similarity scores by calculating the angle or distance between the vectors: a smaller angle or distance signifies higher similarity. By leveraging these mathematical computations, the retriever identifies and ranks the embeddings that most closely align with the user's query based on their similarity scores.

In some embodiments, the retriever 144 may determine that none of the retrieved embeddings meet a threshold similarity score and may request 212 generation of alternate query based on none of the similarity scores between the plurality of embeddings and a representation of the query in the vector space meeting a threshold.

Figure 2B:
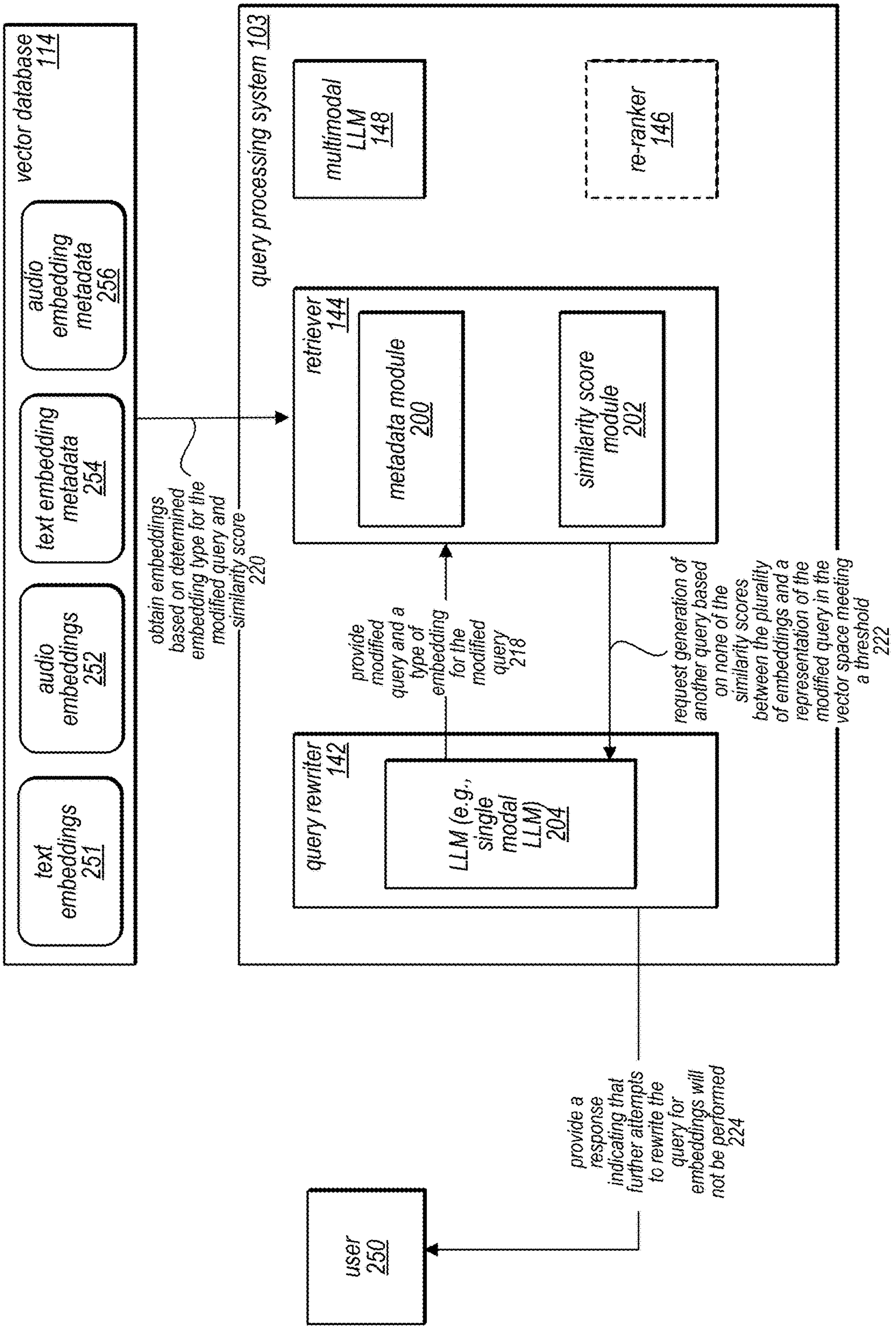
FIG. 2B illustrates a more detailed view of a query processing system of a retrieval augmented generation (RAG) system that provides a response indicating that further attempts to rewrite a query for embeddings will not be performed, according to some embodiments.

FIG. 2B illustrates a more detailed view of a query processing system of a retrieval augmented generation (RAG) system that provides a response indicating that further attempts to rewrite a query for embeddings will not be performed, according to some embodiments.

In some embodiments, the retriever 144 may determine, as discussed in FIG. 2A that similarity scores between the embeddings of an indicated embeddings type (e.g., audio embedding or text embedding) fail to meet a predefined similarity score. Upon determination that none of the retrieved embeddings meet the threshold similarity score (which indicates that there is insufficient relevance or accuracy) the retriever 144 may request to generate an alternate query to improve the chances of retrieving more relevant embeddings from the vector database 114, as discussed in FIG. 2A.

In some embodiments, the query rewriter 142, upon receiving a request from the retriever 144 to generate an alternate query, may generate a modified query, based on the initial user query. The query rewriter 142 may modify the query by adding additional keywords, expanding on specific terms, or adjusting the structure to provide a different query to use to identify text embedding/audio embedding that has a similarity score above the threshold amount. In some embodiments, a query rewriter 142 may use a large language model (LLM) 204, such as a single-modal LLM, to refine and generate modified queries that may result in embeddings with higher similarity score for the modified query. The LLM 204 may generate a modified query that incorporate improvements such as rephrasing, incorporating synonyms, or adding contextually relevant terms to expand the query's scope to find an embedding with a higher similarity score. By generating a modified query and determining the appropriate embedding type, the query rewriter 142 may generate a query that may yield embeddings that meet the desired threshold of similarity. The process of rewriting a query and determining threshold scores may be performed iteratively until the retriever 144 finds an embedding that meets a threshold similarity score or a threshold amount of query rewrites is reached.

The LLM 204 may obtain 220 embeddings based on determined embedding type for the modified query and similarity score. In some embodiments, the retriever 144 may determine whether similarity scores between the embeddings of an indicated embeddings type and the modified query. Upon determination that none of the retrieved embeddings based on the modified query meet the threshold similarity score (which indicates that there is insufficient relevance or accuracy) the retriever 144 may request 222 generation of another query based on none of the similarity scores between the plurality of embeddings and a representation of the modified query in the vector space meeting the threshold score. In some embodiments, based on a threshold number of query rewrites being reached, the query rewriter 142 may provide 224 a response indicating that further attempts to rewrite the query for embeddings will not be performed.

Figure 3A:
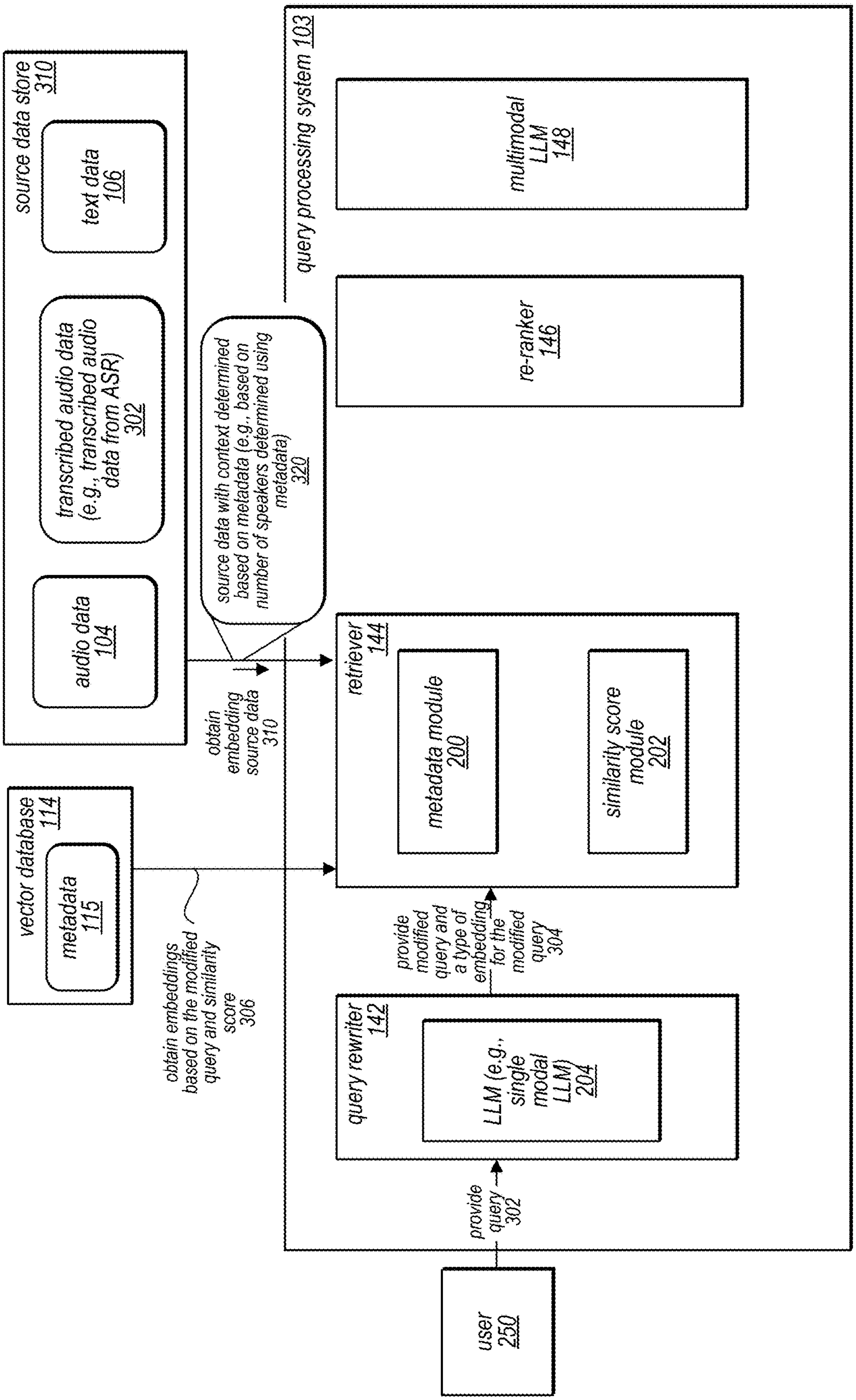
FIG. 3A illustrates a more detailed view of a query processing system of a retrieval augmented generation (RAG) system that obtains embedding source data with context determined based on embeddings metadata, according to some embodiments.

FIG. 3A illustrates a more detailed view of a query processing system of a retrieval augmented generation (RAG) system that obtains embedding source data with context determined based on embeddings metadata, according to some embodiments.

In some embodiments, a user 250 may provide 302 a query to a query rewriter 142, wherein the query rewriter 142 provides 304 modified query and a type of embedding for the modified query to a retriever 144. In some embodiments, the query rewriter 142 may initially provide an unmodified query to the retriever 144, and upon a request to generate a modified query based on none of embeddings obtained from a vector database meeting a threshold similarity score (as discussed in FIGS. 2A-2B), provide a modified query. In some embodiments, the query rewriter 142 may provide a modified query without a query modification request, based on the initial query received. In some embodiments, the retriever may filter the vector database 114 for embeddings of a specified type using metadata 115 and may obtain 306 embeddings based on the modified query and similarity score.

In some embodiments, the retriever 144 may determine using the metadata relevant segments of speech portions of audio data from which the embeddings were generated. For example, the retriever may analyze the metadata 115 associated with a text embedding (or an audio embedding) that has met a threshold similarity score with a representative of a query in a vector space. The metadata 115 may comprise information, such as keywords, topics, and contextual markers, and the retriever 144 may use the metadata 115 to understand a contextual relevance of the text embedding (or an audio embedding) in relation to the user's query. Using this contextual understanding, the retriever 144 may then identify specific parts that align with the context indicated by the text embedding metadata. After identifying these segments, the retriever obtains the contextualized source data from which the respective embeddings are derived. The retriever 144 may access the original audio recordings and extract the relevant portions that match the context provided by the metadata. In some embodiments, the retriever 144 may balance between precision of targeted information retrieval and contextual richness by first searching for embeddings on the sentence level to focus on identifying specific sentences that closely match the query based on their embeddings. Once these sentence-level embeddings are identified, the retriever 144 may expand the results to encompass the relevant conversation segments surrounding these sentences. This expansion may allow the multimodal LLM 148 to access a broader context during the response generation. For example, the retriever 144 may use metadata, such as language, to ensure that only transcripts in a specific language are considered. In another example, the retriever 144 may use metadata 115, such as the number of speakers in a conversation, to obtain the portion of the conversation (e.g., rounds of conversations) that provide sufficient context. In some embodiments, a conversation may be defined as the adjacent segments that include the identified sentence and involve interactions between multiple speakers. The retriever 144 may identify a number of speakers using the metadata 115.

In some embodiments, the retriever 144 may obtain 310 embedding source data from a source data store 310. The source data store 310 may contain audio data 104 (including raw audio recordings for both a speech portion and non-speech portions), and text data 106, which encompasses written documents, articles, reports, and other textual information. Furthermore, the source data store 310 may comprise transcribed audio data 302 (e.g., transcribed audio data stored as text from ASR, as discussed in FIG. 1A). The source data store 310 may be implemented as part of a RAG system 100, wherein the data store is integrated with the RAG infrastructure. In some embodiments, the source data store 310 may be outside the RAG system 100, and may reside in an external database or cloud storage service In some embodiments, source data 320 obtained may further include additional portions associated with a context determined based on metadata (e.g., based on number of speakers determined using metadata). For example, the source data 320 may include portions associated with number of speakers before and after a portion associated with an audio/text embedding. For example, the retriever 144 may be configured to include segments from two speakers surrounding the identified sentence as conversational context to the embeddings source data. Using the metadata, the retriever 144 may obtain source data 320 that includes two speakers surrounding the sentence identified with an embedding from the vector database 114.

Figure 3B:
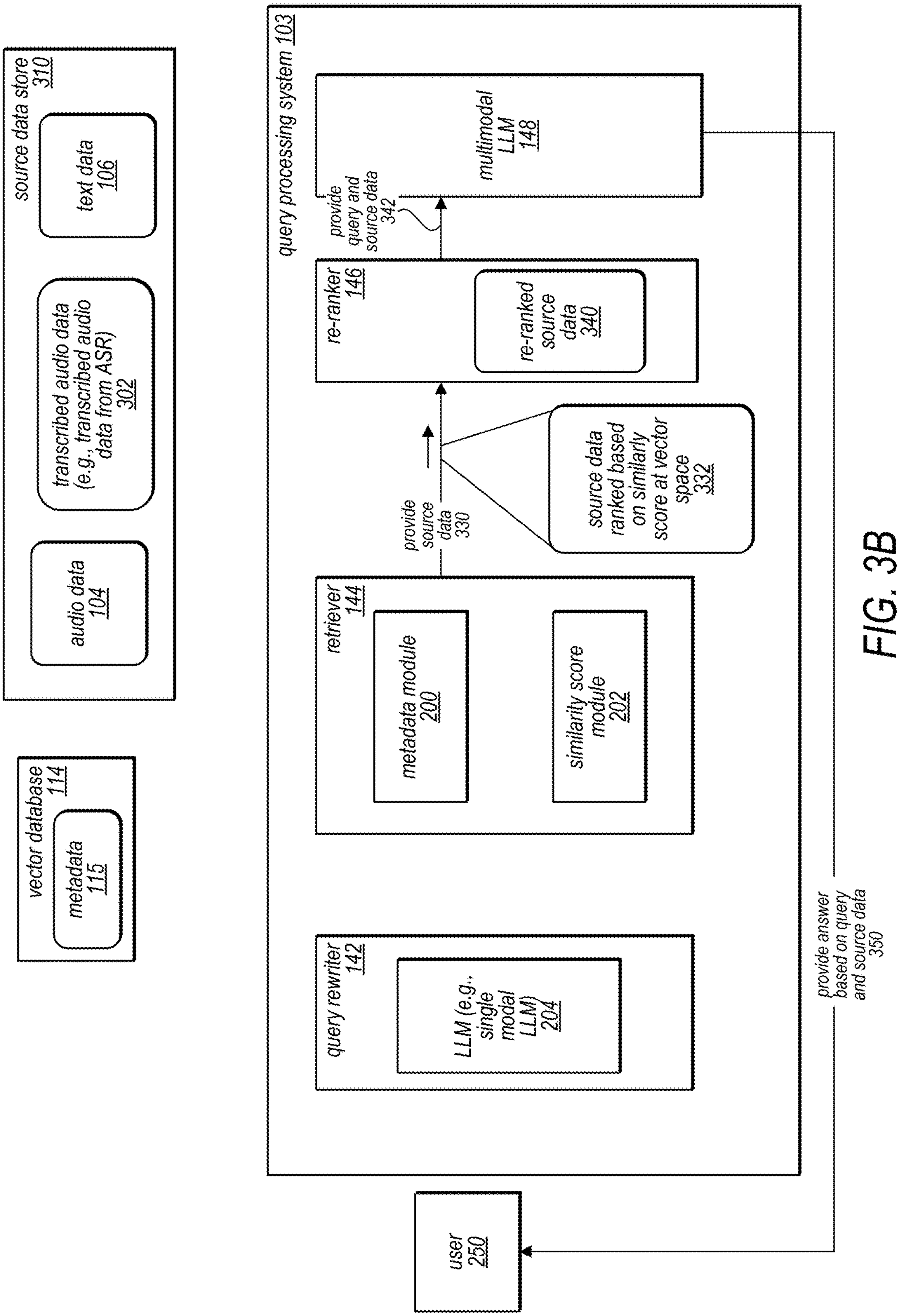
FIG. 3B illustrates a more detailed view of a query processing system of a retrieval augmented generation (RAG) system that re-ranks obtained embedding source data and provides selected embedding source data to a multimodal large language model (LLM), according to some embodiments.

FIG. 3B illustrates a more detailed view of a query processing system of a retrieval augmented generation (RAG) system that re-ranks obtained embedding source data and provides selected embedding source data to a multimodal large language model (LLM), according to some embodiments.

In some embodiments, a retriever 144 may provide source data (e.g., source data that includes context information) obtained from a source data store 310 to a re-ranker 146. As discussed above, embedding-based retrieval by the retriever 144 may calculate similarity scores between a query and embeddings to identify potentially relevant documents or audio segments. In some embodiments, a re-ranker 146 may determine that although the embeddings capture semantic meanings effectively, the source data do not match context of the user's query. In some embodiments, a modifications of the user's initial query generated by the query rewriter 142 may result in embeddings that do not match the context of the user's initial query. In some embodiments, the re-ranker 146 may evaluate an initial set of retrieved documents or audio segments associated with the embeddings that meet a threshold similarity score and may reorder/rank them to ensure the most contextually appropriate and relevant one is provided to a multimodal LLM 148. For text data, the re-ranker 146 may use an LLM or another machine learning model to assess the relevance of each document to a query. For audio data, the re-ranker 146 may perform (e.g., using the LLM) a similar function and reorder/rank audio segments to prioritize those that most closely match the query's context and intent. In some embodiments, a ranking/ordering for the re-ranked source data 340 may be different from a ranking/ordering for initial source data 332 that are ranked based on similarity scores at vector space. In some embodiments, the re-ranker 146 may determine non-vector based similarity scores by requesting an LLM generate scores indicating respective similarities between the retrieved source data and the query. The re-ranker 146 may provide a query from a user 250 and selected source data 342 (e.g., source data with the highest ranking based on the re-ranker 146). In some embodiments, a multimodal LLM may provide 350 an answer based on the query and the selected source data.

Figure 4:
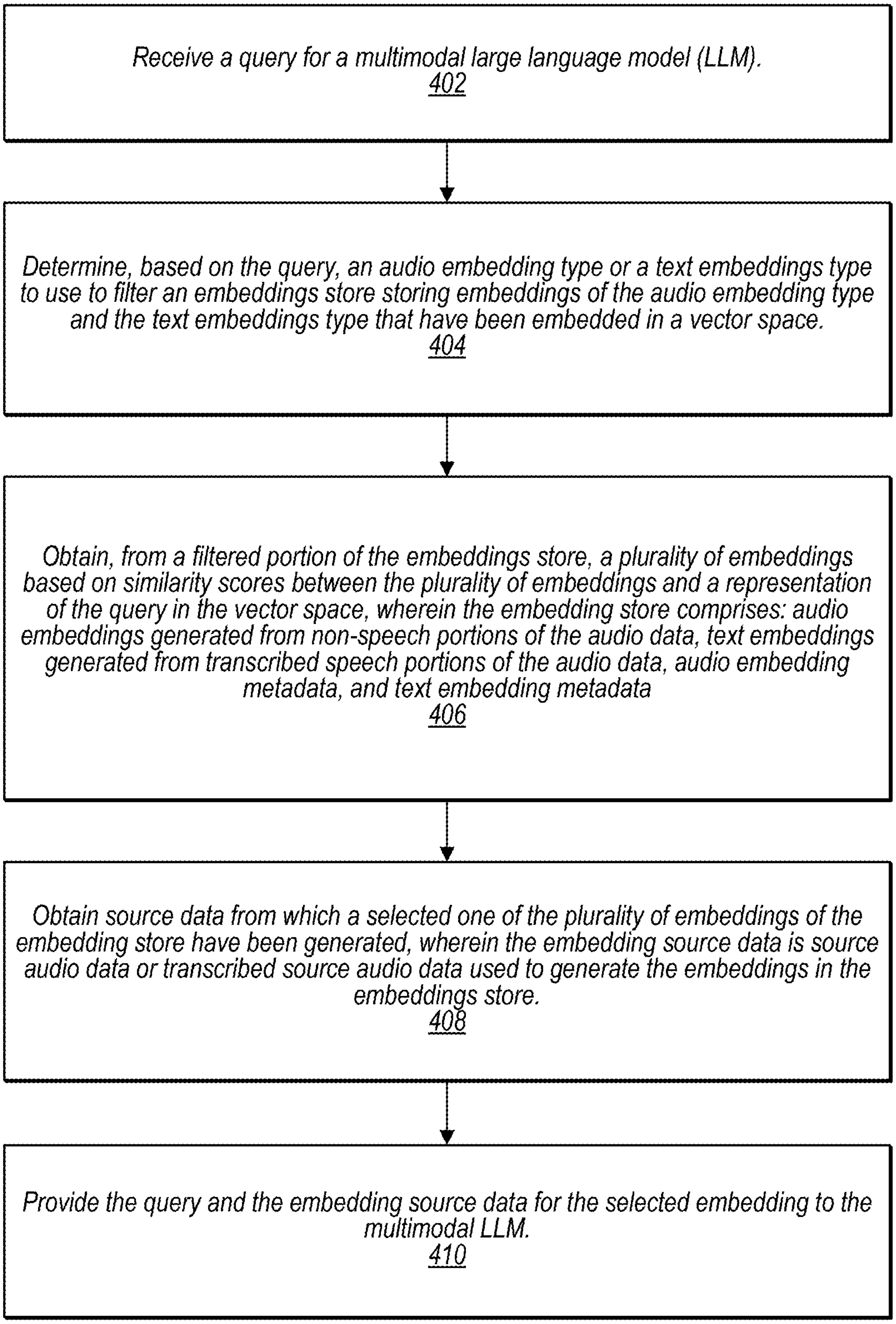
FIG. 4 illustrates a flowchart of operations performed by a retrieval augmented generation (RAG) system to determine embedding source data to be provided with a query for a multimodal large language model (LLM), according to some embodiments.

FIG. 4 illustrates a flowchart of operations performed by a retrieval augmented generation (RAG) system to determine embedding source data to be provided with a query for a multimodal large language model (LLM), according to some embodiments.

At block 402, a query for a multimodal large language model (LLM) may be received. As further discussed in FIG. 2A, in some embodiments, a user may provide a query via a text input or an audio (e.g., voice) input. In some embodiments, the query may use a plurality of modes, such as a query that comprises a video and a question about the video.

At block 404, an audio embedding type or a text embeddings type to use to filter an embeddings store storing embeddings of the audio embedding type and the text embeddings type that have been embedded in a vector space may be determined based on the query. In some embodiments, a query rewriter of a multimodal RAG system may determine using an LLM, the audio embedding type or a text embeddings type, as further discussed in FIG. 1B and FIGS. 2A-2B.

At block 406, a plurality of embeddings based on similarity scores between the plurality of embeddings and a representation of the query in the vector space may be obtained from a filtered portion of the embeddings store, wherein the embeddings store comprises: audio embeddings generated from non-speech portions of audio data, text embeddings generated from transcribed speech portions of the audio data, audio embedding metadata, and text embedding metadata. In some embodiments, the embeddings of a certain type, such as audio embedding or text embedding, may be used to filter a vector database using metadata indicating the type of the embedding, as further discussed in FIG. 1B.

At block 408, embedding source data from which a selected one of the plurality of embeddings of the embeddings store have been generated is obtained, wherein the embedding source data is source audio data or transcribed source audio data used to generate the embeddings in the embeddings store. In some embodiments, the embedding source data may include portions that provide context, as further discussed in FIGS. 3A-3B.

At block 410, the query and the embedding source data for the selected embedding may be provided to the multimodal LLM. In some embodiments, the embedding source data may be selected based on a similarity score ranking that was performed by a re-ranker, as further discussed in FIGS. 3A-3B.

Figure 5:
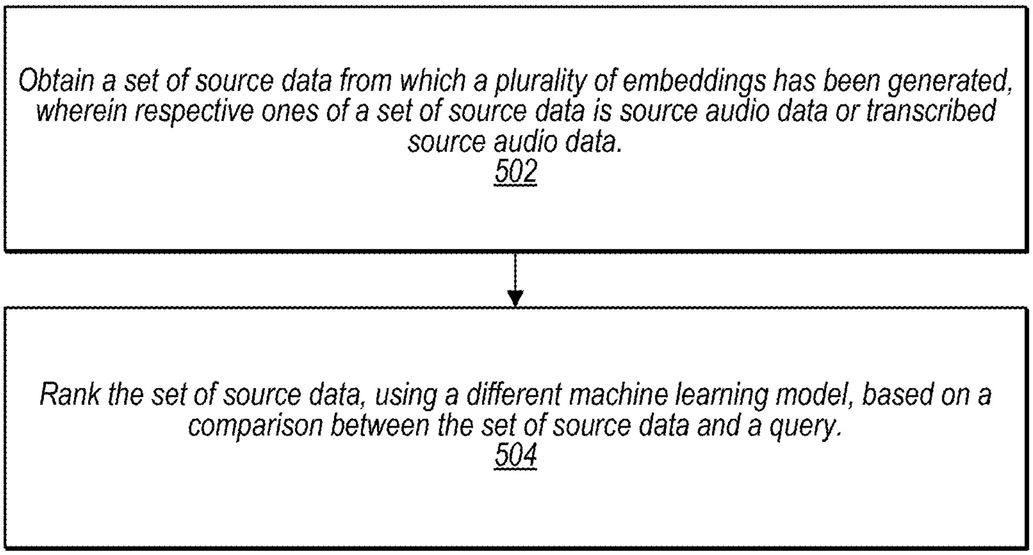
FIG. 5 illustrates a flowchart of operations performed by a retrieval augmented generation (RAG) system to rank a set of source data and select, based on the ranking, source data to be provided to a multimodal large language model (LLM) to answer a query, according to some embodiments.

FIG. 5 illustrates a flowchart of operations performed by a retrieval augmented generation (RAG) system to rank a set of source data and select, based on the ranking, source data to be provided to a multimodal large language model (LLM) to answer a query, according to some embodiments.

At block 502, a set of source data from which the plurality of embeddings has been generated may be obtained, wherein respective ones of the set of source data is source audio data or transcribed source audio data. In some embodiments, the source audio data or transcribed source audio data may be obtained using metadata, such as start time and end time of the respective speech/non-speech portions, as further discussed in FIG. 2A-2B.

At block 504, the set of source data may be ranked, using a different machine learning model, based on a comparison between the set of source data and a query. In some embodiments, a ranking for the re-ranked source data may be different from a ranking for initial source data that was ranked based on similarity score at vector space, as further discussed in FIG. 3B. In some embodiments, the embedding source data with the highest ranking (along with the query) may be provided to a multimodal LLM for the multimodal LLM to generate an answer to the query a second set of similarity scores between the set of source data and the query may be determined using a different machine learning model. In some embodiments, a second set of non-vector based similarity scores may be determined by a re-ranker using a large language model, as further discussed in FIGS. 3A-3B.

Example Computer System

Figure 6:
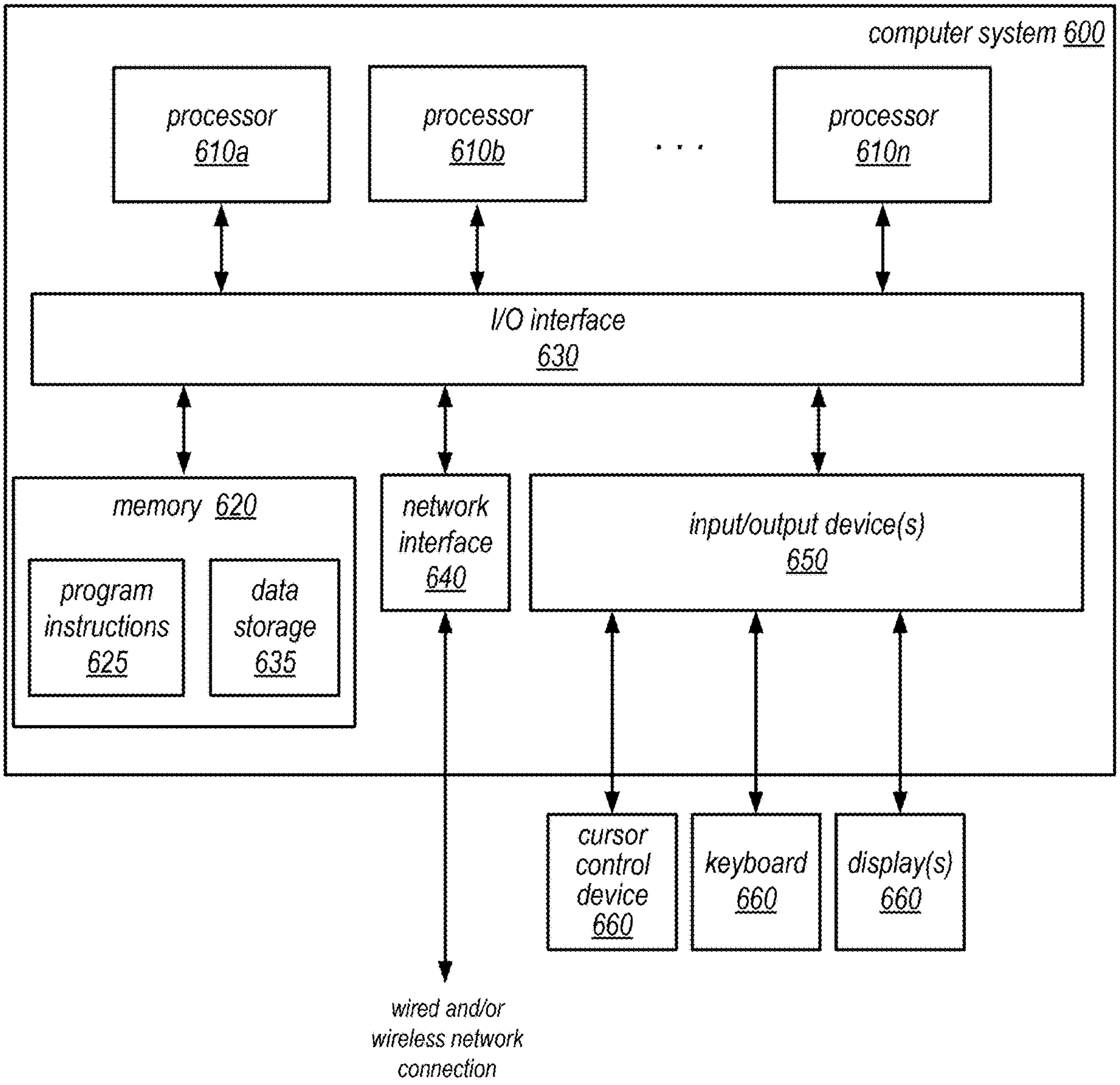
FIG. 6 illustrates a block diagram illustrating an example computer system that implements some, or all, of the techniques described herein, according to some embodiments.

Any of various computer systems may be configured to implement processes associated with a multimodal retrieval augmented generation (RAG) system or any other component of the above figures. For example, FIG. 6 illustrates a block diagram illustrating an example computer system that implements some, or all, of the techniques described herein, according to some embodiments. In various embodiments, the multimodal RAG system, an index processing system, a query processing system, a large language model (LLM), or any other component of the above figures, FIGS. 1-5, may each include one or more computer systems 600 such as that illustrated in FIG. 6.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or that provide a downloadable application, while in other embodiments servers may include more, fewer, or different elements than computer system 600.

In various embodiments, computing device 600 may be a uniprocessor system including one processor or a multiprocessor system including several processors 610*a*-610*n* (e.g., two, four, eight, or another suitable number). Processors 610*a*-610*n* may include any suitable processors capable of executing instructions. For example, in various embodiments, processors 610*a*-610*n* may be processors implementing any of a variety of instruction set formats (ISAs), such as the x66, PowerPC, SPARC, or MIPS ISAs, or any other suitable ISA. In some embodiments, processors 610*a*-610*n* may include specialized processors such as graphics processing units (GPUs), application specific integrated circuits (ASICs), etc. In multiprocessor systems, each of processors 610*a*-610*n* may commonly, but not necessarily, implement the same ISA.

System memory 620 may be configured to store program instructions and data accessible by processor(s) 610*a*-610*n*. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (e.g., program instructions) 625 and data storage 635.

In one embodiment, I/O interface 630 may be configured to coordinate I/O traffic between processors 610*a*-610*n*, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, I/O interface 630 may include support for devices attached via an automotive may bus, etc. In some embodiments, the function of I/O interface 630 may be split into two or more separate components, such as a north bridge and a south bridge, for example. Also, in some embodiments, some, or all of the functionality of I/O interface 630, such as an interface to system memory 620, may be incorporated directly into processors 610*a*-610*n*.

In some embodiments, the network interface 640 may be coupled to I/O interface 630, and one or more input/output devices 650, such as cursor control device 660, keyboard 660, and display(s) 660. In some cases, it is contemplated that embodiments may be implemented using a single instance of computer system 600, while in other embodiments multiple such computer systems, or multiple nodes making up computer system 600, may be configured to host different portions or instances program instructions as described above for various embodiments. For example, in one embodiment some elements of the program instructions may be implemented via one or more nodes of computer system 600 that are distinct from those nodes implementing other elements.

Network interface 640 may be configured to allow data to be exchanged between computing device 600 and other devices associated with a network or networks. In various embodiments, network interface 640 may support communication via any suitable wired or wireless general data networks, such as types of ethernet networks, cellular networks, Bluetooth networks, Wi-Fi networks, Ultra-wideband Networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 600 via I/O interface 630. One or more non-transitory computer-readable storage media may also include any volatile or non-volatile media such as RAM (e.g., SDRAM, DDR SDRAM, RDRAM, SRAM, etc.), ROM, etc., that may be included in some embodiments, of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of various services, databases, devices, and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more computing devices configured to implement a retrieval augmented generation (RAG) system, configured to:

receive a query for a multimodal large language model (LLM) to answer;

determine, based on the query, an audio embedding type or a text embeddings type to use to filter an embeddings store storing embeddings of the audio embedding type and the text embeddings type that have been embedded in a vector space;

obtain, from a filtered portion of the embeddings store, a plurality of embeddings based on similarity scores between the plurality of embeddings and a representation of the query in the vector space, wherein:

the embeddings store comprises: audio embeddings generated from sounds included in non-speech portions of audio data, text embeddings generated from transcribed speech portions of the audio data, audio embedding metadata, and text embedding metadata;

obtain embedding source data from which a selected one of the plurality of embeddings of the embeddings store have been generated, wherein the embedding source data is source audio data or transcribed source audio data used to generate the embeddings in the embeddings store; and provide the query and the embedding source data for the selected embedding to the multimodal LLM; and wherein the system further comprises one or more computing devices configured to implement the multimodal LLM, configured to:

receive the query and the embedding source data for the selected embedding; and generate a response to the query using the source data.

2. The system of claim 1, wherein multimodal RAG system is configured to:

generate the embeddings store, wherein to generate the embeddings store, the multimodal RAG system is configured to:

receive the audio data;

determine for the audio data the non-speech portions of the audio data and speech portions of the audio data;

generate from the non-speech portions of the audio data, using an audio embedding machine learning model, the audio embeddings, and the audio embedding metadata, wherein the audio embedding metadata indicates the audio embedding type;

transcribe from the speech portions of the audio data, using an automatic speech recognition machine learning model, the transcribed speech portions; and generate from the transcribed speech portions, using a text embedding machine learning model, the text embeddings, and the text embedding metadata, wherein the text embedding metadata indicates the text embedding type.

3. The system of claim 1, wherein multimodal RAG system is configured to:

determine that none of the similarity scores between the plurality of embeddings and the query meet a similarity score threshold;

generate a modified query using a single modal LLM; and obtain, from the embeddings store, another plurality of embeddings based on similarity scores between the other plurality of embeddings and the modified query.

4. The system of claim 3, wherein the multimodal RAG system is configured to:

determine, based on the modified query, a different embedding type to use for the modified query to filter the embeddings store than an embedding type used for the query.

5. A method, comprising:

receiving a query for a multimodal large language model (LLM);

determining, based on the query, an audio embedding type or a text embeddings type to use to filter an embeddings store storing embeddings of the audio embedding type and the text embeddings type that have been embedded in a vector space;

obtaining, from a filtered portion of the embeddings store, a plurality of embeddings based on similarity scores between the plurality of embeddings and a representation of the query in the vector space, wherein:

the embeddings store comprises: audio embeddings generated from sounds included in non-speech portions of audio data, text embeddings generated from transcribed speech portions of the audio data, audio embedding metadata, and text embedding metadata; and obtaining embedding source data from which a selected one of the plurality of embeddings of the embeddings store have been generated, wherein the embedding source data is source audio data or transcribed source audio data used to generate the embeddings in the embeddings store; and providing the query and the embedding source data for the selected embedding to the multimodal LLM.

6. The method of claim 5, further comprising:

generating the embeddings store, wherein the generating comprises:

receiving the audio data;

determining for the audio data the non-speech portions of the audio data and speech portions of the audio data;

generating from the non-speech portions of the audio data, using an audio embedding machine learning model, the audio embeddings, and the audio embedding metadata, wherein the audio embedding metadata indicates the audio embedding type;

transcribing from the speech portions of the audio data, using an automatic speech recognition machine learning model, the transcribed speech portions; and generating from the transcribed speech portions, using a text embedding machine learning model, the text embeddings, and the text embedding metadata, wherein the text embedding metadata indicates the text embedding type.

7. The method of claim 5, further comprising:

determining that none of the similarity scores between the plurality of embeddings and the query meet a similarity score threshold;

generating a modified query using a single modal LLM; and obtaining, from the embeddings store, another plurality of embeddings based on similarity scores between the other plurality of embeddings and the modified query.

8. The method of claim 7, further comprising:

determining, based on the modified query, a different embedding type to use for the modified query to filter the embeddings store than an embedding type used for the query.

9. The method of claim 8, further comprising:

determining that none of the similarity scores between the other plurality of embeddings and the modified query meet the similarity score threshold; and upon a determination that a threshold number of query rewriting has been performed, providing a response indicating that no embeddings.

10. The method of claim 5, further comprising:

determining, using the text embedding metadata, segments of the speech portions of the audio data that are relevant to a context for the speech portions; and obtaining contextualized source data from which the respective plurality of embeddings associated with the segments of the speech portions of the audio data.

11. The method of claim 10, further comprising:

determining, using the text embedding metadata, a number of speakers in a conversation; and wherein determining the segments of the speech portions of the audio data that are relevant to the context is based on the number of speakers in the conversation.

12. The method of claim 5, further comprising:

obtaining a set of source data from which the plurality of embeddings has been generated, wherein respective ones of the set of source data is source audio data or transcribed source audio data;

ranking the set of source data, using a different machine learning model, based on a comparison between the set of source data and the query.

13. One or more non-transitory, computer-readable storage media, storing program instructions that, when executed on or across one or more computing devices, cause the one or more computing devices to implement receiving a query for a multimodal large language model (LLM);

determining, based on the query, an audio embedding type or a text embeddings type to use to filter an embeddings store storing embeddings of the audio embedding type and the text embeddings type that have been embedded in a vector space;

obtaining, from a filtered portion of the embeddings store, a plurality of embeddings based on similarity scores between the plurality of embeddings and a representation of the query in the vector space, wherein:

the embeddings store comprises: audio embeddings generated from sounds included in non-speech portions of audio data, text embeddings generated from transcribed speech portions of the audio data, audio embedding metadata, and text embedding metadata; and obtaining embedding source data from which a selected one of the plurality of embeddings of the embeddings store have been generated, wherein the embedding source data is source audio data or transcribed source audio data used to generate the embeddings in the embeddings store; and providing the query and the embedding source data for the selected embedding to the multimodal LLM.

14. The one or more non-transitory, computer-readable, storage media of claim 13, wherein the program instructions, when executed on or across one or more computing devices, cause the one or more computing devices to implement:

generating the embeddings store, wherein the generating comprises:

receiving the audio data;

determining for the audio data the non-speech portions of the audio data and speech portions of the audio data;

generating from the non-speech portions of the audio data, using an audio embedding machine learning model, the audio embeddings and the audio embedding metadata, wherein the audio embedding metadata indicates the audio embedding type;

transcribing from the speech portions of the audio data, using an automatic speech recognition machine learning model, the transcribed speech portions; and generating from the transcribed speech portions, using a text embedding machine learning model, the text embeddings, and the text embedding metadata, wherein the text embedding metadata indicates the text embedding type.

15. The one or more non-transitory, computer-readable, storage media of claim 13, wherein the program instructions, when executed on or across one or more computing devices, cause the one or more computing devices to implement:

determining that none of the similarity scores between the plurality of embeddings and the query meet a similarity score threshold;

generating a modified query using a single modal LLM; and obtaining, from the embeddings store, another plurality of embeddings based on similarity scores between the other plurality of embeddings and the modified query.

16. The one or more non-transitory, computer-readable, storage media of claim 15, wherein the program instructions, when executed on or across one or more computing devices, cause the one or more computing devices to implement:

determining, based on the modified query, a different embedding type to use for the modified query to filter the embeddings store than an embedding type used for the query.

17. The one or more non-transitory, computer-readable, storage media of claim 16, wherein the program instructions, when executed on or across one or more computing devices, cause the one or more computing devices to implement:

determining that none of the similarity scores between the other plurality of embeddings and the modified query meet the similarity score threshold; and upon a determination that a threshold number of query rewriting has been performed, providing a response indicating that no embeddings.

18. The one or more non-transitory, computer-readable, storage media of claim 13, wherein the program instructions, when executed on or across one or more computing devices, cause the one or more computing devices to implement:

determining, using the text embedding metadata, segments of the speech portions of the audio data that are relevant to a context for the speech portions; and obtaining contextualized source data from which the respective plurality of embeddings associated with the segments of the speech portions of the audio data.

19. The one or more non-transitory, computer-readable, storage media of claim 18, wherein the program instructions, when executed on or across one or more computing devices, cause the one or more computing devices to implement:

determining, using the text embedding metadata, a number of speakers in a conversation; and wherein determining the segments of the speech portions of the audio data that are relevant to the context is based on the number of speakers in the conversation.

20. The one or more non-transitory, computer-readable, storage media of claim 13, wherein the program instructions, when executed on or across one or more computing devices, cause the one or more computing devices to implement:

obtaining a set of source data from which the plurality of embeddings has been generated, wherein respective ones of the set of source data is source audio data or transcribed source audio data;

ranking the set of source data, using a different machine learning model, based on a comparison between the set of source data and the query.

* * * * *